(No Model.)
A. E. RINEHART.
CAMERA SHUTTER.
No. 338,782. Patented Mar. 30, 1886.
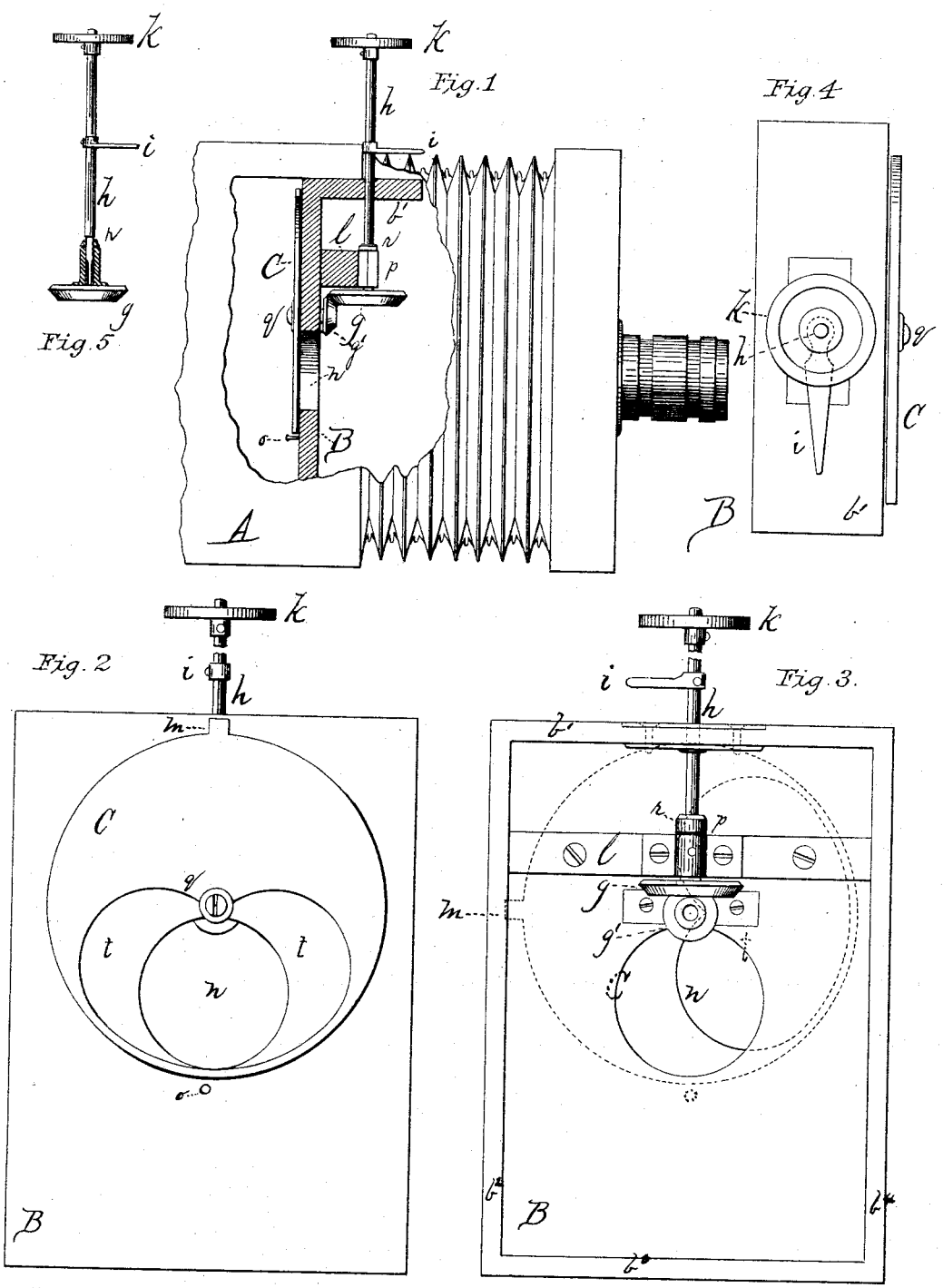
WITNESSES
William J. Acheson
D. Mackenzie
INVENTOR
Alfred E. Rinehart

UNITED STATES PATENT OFFICE.

ALFRED E. RINEHART, OF DENVER, COLORADO.

CAMERA-SHUTTER.

SPECIFICATION forming part of Letters Patent No. 338,782, dated March 30, 1886.

Application filed April 20, 1885. Serial No. 162,759. (No model.)

*To all whom it may concern:*

Be it known that I, ALFRED E. RINEHART, a citizen of the United States, residing at Denver, in the county of Arapahoe and State of Colorado, have invented a new and useful Shutter for Photographic Cameras, of which the following is a specification.

My invention relates to improvements in photographic-camera shutters, by which the light may be admitted and excluded instantaneously, or for a longer period of time, as may be required; and its object is to provide a shutter that will admit light as desired and shut it out as desired, and expose all parts of the sensitive plate in the camera for an equal period of time, and also to provide a shutter that is especially adapted to instantaneous work.

The invention consists of a partition set vertically in the front part of the camera, this partition having an aperture in it to permit the light to pass from the lens to the sensitive plate. This aperture is guarded by means of a shutter, which is made of a thin sheet of metal or other suitable material, of such a shape and so constructed and attached to and against the partition that when revolved around a fixed center the shutter, coming abreast of the aperture in the partition, will close the aperture and shut out the light, and when moved away from abreast of the aperture will open it and admit the light to the sensitive plate, one part of the shutter as it revolves following after another part in such a manner that the exposure of all parts of the sensitive plate must be equal.

In the accompanying drawings, in which similar letters refer to similar parts throughout, I give a description of my invention and its method of operating.

Figure 1 is a side view of the camera, (broken,) showing the relative position of the parts inside the camera, the partition B being shown in vertical section, made partly to one side of the middle line. Fig. 2 is the invention viewed from the rear of the camera. Fig. 3 is the same viewed from the front of the camera. Fig. 4 is the same viewed from above. Fig. 5 is one bevel gear-wheel, with socket, shoulder, spindle, index, and thumb-nut attached.

A is the camera, in which the invention works between the lens and the sensitive plate.

B is the partition, made of wood or other suitable material, in the shape of a shallow box with four sides, $b'$ $b^2$ $b^3$ $b^4$, and a bottom. It has a round aperture, $n$, cut through it, to permit light to pass from the lens to the sensitive plate. A cleat, $l$, is fixed across it horizontally, to which is attached a journal box, $p$, in which the journal of the horizontal bevel-wheel $g$ works, there being a shoulder, $r$, above the journal-box to support the journal and wheel. The spindle $h$ passes through the top $b'$ of the partition B.

C is the revolving shutter, made of a thin circular sheet of metal, wood, or other suitable material. It has an opening, $t$, cut through it, as large as or larger than the aperture in the partition B. It is attached at its center by the center bolt, $q$, around which it revolves, to the partition B, and revolves in contact with the partition B. It has a spur, $m$, which strikes against the peg $o$ and stops its motion. When the spur $m$ is in the position shown in Fig. 2, the aperture $n$ is wide open. When the spur $m$ is at $o$, the aperture $n$ is closed. These positions of the spur $m$ are also indicated by the index $i$, which turns with the spindle $h$.

$g$ $g'$ are bevel gear-wheels working at right angles to each other—$g$ attached to the spindle $h$, and $g'$ is attached to the center bolt, $q$, which is attached to the shutter.

$h$ is the spindle connecting the thumb-nut $k$ with the bevel gear-wheel $g$, and passing through the top of the camera. It can be disconnected from the wheel $g$ and withdrawn from the camera, and thus permit the partition to be taken from the camera.

$i$ is the index attached to the spindle $h$, to indicate the position of the shutter.

$k$ is the thumb-nut.

The method of operating is as follows: After focusing, the revolving shutter is set with the spur against the peg, thus closing the aperture in the partition, and the camera is dark behind the partition. The sensitive plate is then put in its place. If an instantaneous exposure of the sensitive plate is desired, the shutter is revolved rapidly by means of the thumb-nut, and as the opening in the shutter comes abreast of the aperture in the partition light is admitted to the plate, and immediately thereafter, as the shutter continues its revolution, the aperture is closed and the light cut off from the sensitive plate. The revolution of the shutter is stopped by the spur striking against the peg. If a longer exposure is desired, the shutter is revolved more slowly, or the shutter is left as long as desired in the position shown in Fig. 2.

On account of the exposure of the sensitive plate beginning first on one side and ceasing first on the same side, the time of the exposure of all parts of the plate is the same.

The shutter need not be made circular, but may be made of any other desired shape, and the opening in the shutter may be round, square, or other shape, or may be a mere slit extending from near the center to near the circumference.

A spring may be attached to the spindle, and clock-work applied to operate the shutter automatically and adjust and regulate the time of exposure.

What I claim as my invention, and desire to secure by Letters Patent, is—

In a photographic camera, the revolving shutter C, in combination with the partition B, the center bolt, $q$, the bevel gear-wheels $g$ $g'$, the journal-box $p$, the shoulder $r$, the spindle $h$, the index $i$, and the thumb-nut $k$, all substantially as described, and for the purposes herein set forth.

ALFRED E. RINEHART.

Witnesses:
WILLIAM J. ACHESON,
J. M. BAGLEY.